Oct. 10, 1933.  H. HOLZWARTH  1,929,427
EXPLOSION TURBINE POWER PLANT
Filed Aug. 1, 1925  2 Sheets-Sheet 1
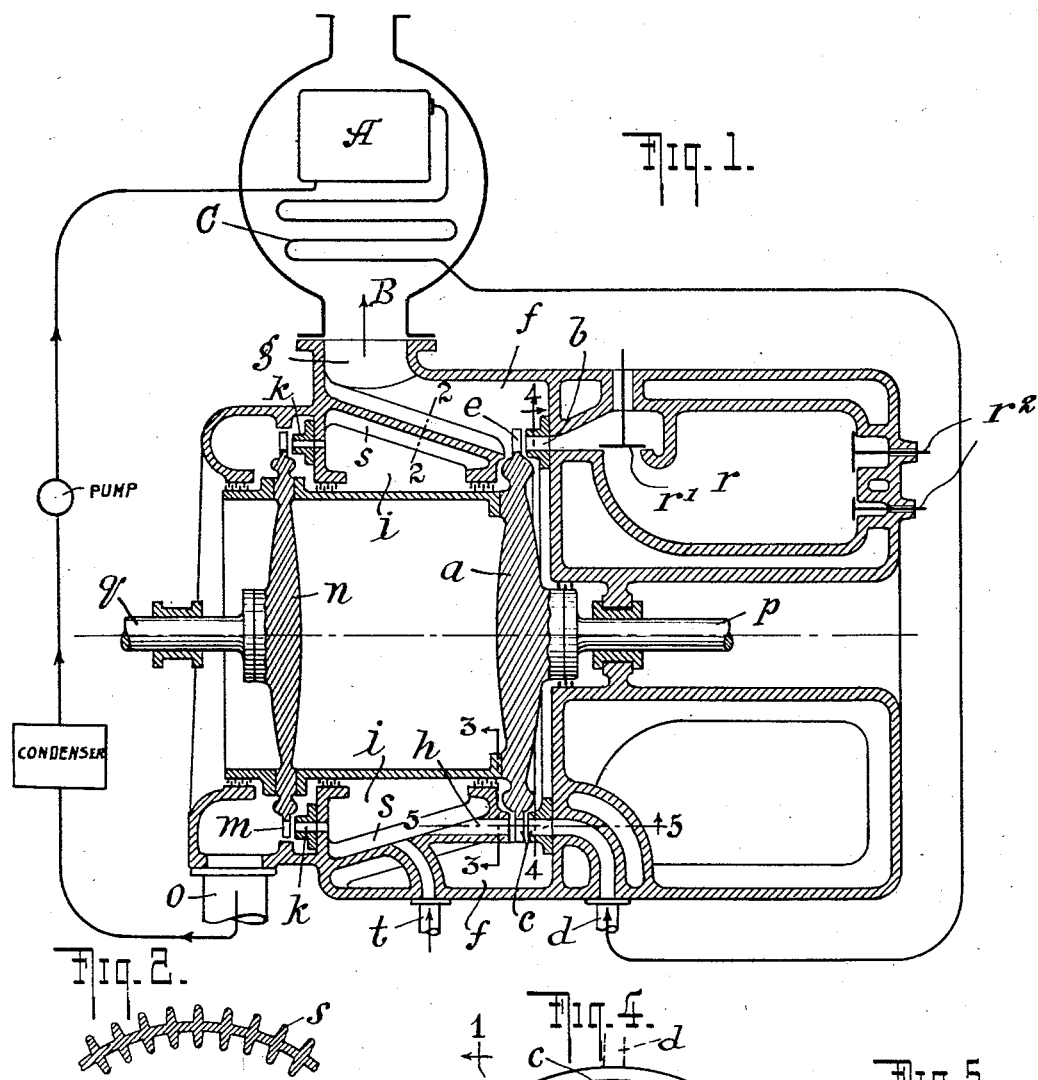
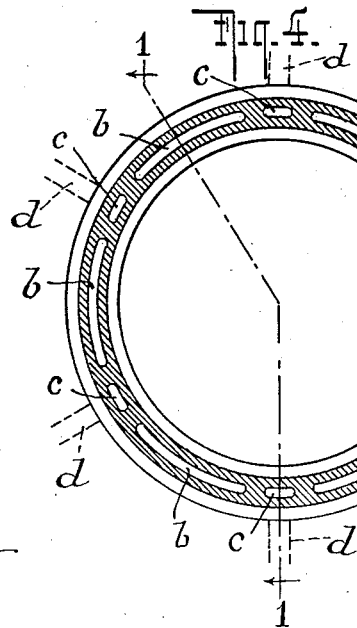
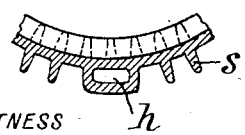
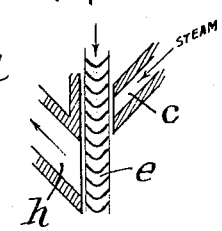
WITNESS
G. V. Rasmussen
INVENTOR
HANS HOLZWARTH
BY
Breses Achrenk
ATTORNEYS

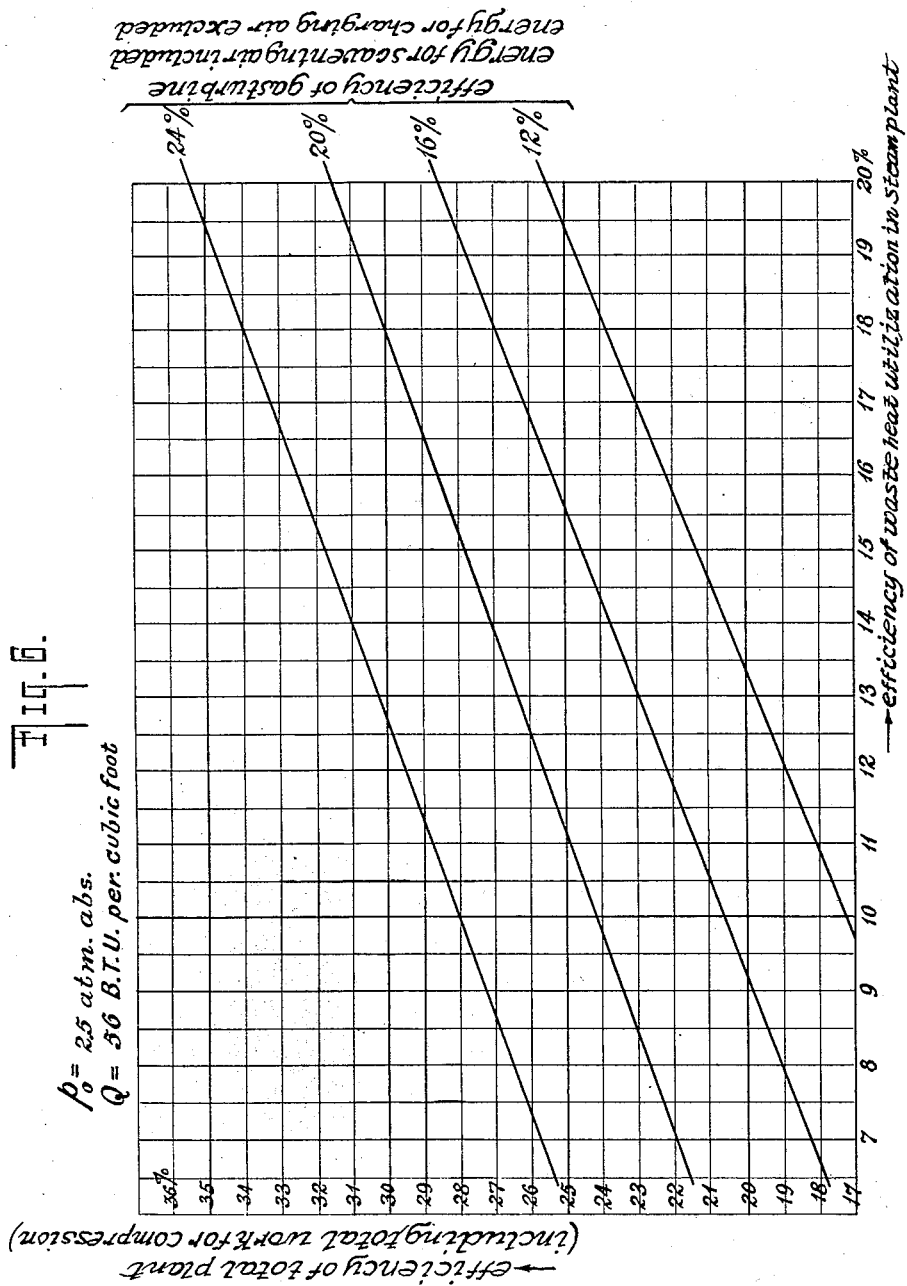

Patented Oct. 10, 1933

1,929,427

UNITED STATES PATENT OFFICE 1,929,427

EXPLOSION TURBINE POWER PLANT

Hans Holzwarth, East Orange, N. J., assignor to Holzwarth Gas Turbine Co., San Francisco, Calif., a corporation of Delaware Application August 1, 1925. Serial No. 47,422

4 Claims. (Cl. 60—49)

My present invention relates to power plants embodying turbines driven by gases resulting from the combustion of gas or oil, and to an improved apparatus for converting the energy of explosion gases, generated under constant volume, into mechanical energy. More particularly, my invention deals with power plants of the type in which the heat of the waste gases or exhaust gases is utilized for the production of steam employed for the generation of power. The object of my invention is to increase the reliability and efficiency of the turbine, as well as the operation of the steam generator as regards the utilization of heat and the amount of steam produced.

A leading feature of this invention consists in utilizing the steam produced in the boiler by the waste heat, for cooling the gas or oil turbine wheel and simultaneously performing work.

Reference is to be had to the accompanying drawings, in which Fig. 1 is a diagrammatic longitudinal section on line 1—1 of Fig. 4, showing a constant volume explosion gas turbine embodying the invention; Figs. 2, 3, 4 and 5 are sections on lines 2—2, 3—3, 4—4 and 5—5 respectively of Fig. 1; and Fig. 6 is a diagram demonstrating the efficiency of the present invention as compared with a simple gas or oil turbine.

The turbine rotor $a$ is driven chiefly by combustion gases issuing from expansion nozzles $b$. The combustion gases are generated by explosions produced in the explosion chambers $r$. Each explosion chamber communicates with the nozzles $b$ by means of a conduit which is provided with a nozzle valve $r'$ diagrammatically indicated in the drawings. The explosion chamber is equipped with further valves $r^2$ permitting the sealing of the chamber after the same has been filled with a combustible gas mixture in a well-known manner. In addition to the nozzles $b$, there are a number of separate steam expansion nozzles $c$ distributed, preferably uniformly, and in alternation with the nozzles $b$ along the periphery and receiving steam from a boiler, such as indicated at A, which is heated by the exhaust gases of the turbine, conveyed thereto through a pipe B. Preferably such steam, on its way from the boiler A to the nozzles $c$, passes through a superheater, for instance as indicated at C. Each of the nozzles $c$ may have its own supply pipe $d$, as illustrated. While I have shown as many steam nozzles $c$ as there are combustion gas nozzles $b$, the latter being considerably wider than the steam nozzles, this relation is not essential, and I may use a smaller number of steam nozzles, even a single nozzle being satisfactory in some cases. The steam passes through the blade channels $e$ of the rotor $a$ and performs work therein, that is to say, it assists in impelling or driving the rotor. Thereupon, the steam either mingles with the exhaust combustion gases in the annular chamber $f$ and passes through the outlet $g$ to the pipe B, or, immediately upon leaving the blade channels $e$, the steam enters receiving nozzles $h$ arranged in approximate registry with the nozzles $c$. From the nozzles $h$ the steam is delivered to an annular collector chamber $i$ and is then projected by nozzles $k$ against the blade ring $m$ on the rotor $n$ of a turbine operated by steam alone. After performing additional work in this second turbine, the steam under condenser pressure, escapes through the outlet $o$. Fig. 1 illustrates the two rotors $a$, $n$ as connected rigidly.

It will be apparent that after they have passed in front of the nozzles $b$, the blade channels $e$ of the rotor $a$ are filled with combustion gases. When subsequently steam jets are projected into these channels, there would be danger of blowing these remnants of combustion gases into the stationary receiving nozzles or catch nozzles $h$, so that the steam entering the condenser connected with the outlet $o$ would be contaminated by the combustion gases and particularly their acid constituents. During an operation continued for a considerable length of time as on ships, the feed water circulated over and over again through the same path would become more and more acid and would consequently exert an injurious corrosive action on the condenser and on the boilers. This objectionable mingling of steam with combustion gases may be avoided by shifting the catch nozzles $h$ circumferentially relatively to the steam nozzles $c$ in the direction of rotation so that the steam will blow the remnants of combustion gases out of the blade channels $e$, but not into the catch nozzles $h$. This is shown clearly in Fig. 5.

The novel arrangement and operation present numerous advantages. While passing through the blade channels $e$ of the rotor of the gas or oil turbine, the steam exerts an efficient cooling action on the blades and disks of said rotor. The steam generated by the exhaust gases is sufficient in amount to effect the required degree of cooling of the blades of the turbine $a$, and as will be seen from the drawings only such steam is charged into the turbine $a$. As a result of this, the amount of scavenging air may be restricted to the minimum required to clear the explosion chambers. This cooling by steam is not accompanied by any braking action on the rotor, but on the contrary the steam performs work and assists the driving of the rotor. The amount of work performed is greater than would be the case in the corresponding rotor of a turbine operated by steam alone, since while passing through the blade channels e the steam is superheated (or superheated to a higher degree, if it entered said channels in a superheated condition). With this arrangement of steam flow, losses are reduced and the temperature drop is increased. Furthermore, I obtain a material improvement in the reliability of operation of the gas or oil turbine and in the total efficiency of this combined plant. The diagram Fig. 6 gives a clear illustration or demonstration of the increased total efficiency of this combined plant as compared to turbines operated exclusively by gas or oil, the efficiency curves of the latter turbines being found in Fig. 221 on page 494 of Schüle's Technische Thermodynamik II. In this diagram the oblique lines represent different gas turbines operating with the efficiencies indicated at the right-hand ends of such lines, such oblique lines indicating on the left-hand scale the total efficiency of a plant which includes a steam turbine operated with steam generated with the waste heat from the gas turbine, while the efficiency of the waste heat utilization in the steam plant is represented on the abscissa. It will be noted that the increase in the total efficiency of the combined gas and steam plant is directly proportional, within the limits illustrated, to the efficiency of the steam plant.

If desired, there may be maintained in the collector chamber $i$ a pressure slightly in excess of that prevailing in the chamber $f$ containing combustion gases. This excess is so proportioned as to prevent the passage of combustion gases into the collector chamber $i$ and to restrict, to a minimum, the passage of steam from said collector chamber to the chamber $f$.

If, as shown in Fig. 1, the exhaust steam after leaving the gas turbine rotor $a$ is collected in the chamber $i$, further important advantages are secured. The temperature in the chamber surrounding the rotor $a$ may be kept higher than hitherto without requiring a resort to scavenging air for cooling purposes, since the gas turbine rotor itself is kept much cooler than hitherto, owing to the passage of steam therethrough. The leakage loss of the gas turbine rotor is also reduced. Moreover, the exhaust steam coming from the gas turbine rotor is again heated or superheated, by the exhausting combustion gases, in the chamber $i$ the surface of which may be increased by the provision of ribs $s$, Figs. 1, 2 and 3. In the low pressure turbine through which the steam passes subsequently it operates preferably as superheated steam with smaller losses than in the saturated condition. If exhaust steam from other plants is available, such steam may be introduced into the chamber $i$ through a connection $t$ and superheated for the subsequent performance of work. The catching and collecting of the steam in the chamber $i$ as it issues from the rotor of the gas turbine in a manner to prevent contamination thereof by combustion gases, is of especial advantage on ships, since it permits re-use of the condensate. If the exhaust steam were allowed to become contaminated by combustion gases, the resulting condensation water would not be suitable as feed water for the boiler, since corrosion would be liable to occur in the condenser.

Various modifications may be made without departing from the nature of my invention as set forth in the appended claims.

I claim:

1. A power plant comprising an explosion turbine having a rotor, a plurality of explosion chambers adapted to receive a combustible mixture for ignition therein to generate gases of high temperature and pressure, a plurality of expansion gas nozzles arranged to direct the combustion gases from said chambers against said rotor, said gases expanding in said nozzles and reaching said rotor at increased velocity and at reduced temperature, a nozzle valve associated with each expansion chamber and adapted in its open position to permit the combustion gases to flow from said chamber to the associated nozzle and in its closed position to cut off the communication between said chamber and said nozzle; a boiler; a conduit for conducting the exhaust gases of said turbine to said boiler to generate steam in the latter at pressures above atmospheric exclusively with the waste heat of such gases; additional nozzles located between said gas nozzles; and a conduit between said additional nozzles and said boiler to conduct only the steam generated in the latter to such additional nozzles.

2. A power plant as set forth in claim 1, including catch nozzles arranged to collect the steam after the same has passed through the turbine rotor, a collecting chamber connected to said catch nozzles to receive the steam therefrom, a second turbine provided with steam nozzles, and a conduit between said collecting chamber and said steam nozzles to conduct the exhaust steam of the first turbine to the rotor of the second turbine.

3. A power plant as set forth in claim 1, including catch nozzles arranged to collect the steam after the same has passed through the turbine rotor, a collecting chamber connected to said catch nozzles to receive the steam therefrom, said collecting chamber being arranged in the vicinity of the conduit which conducts the exhaust gases of the turbine to the boiler, whereby said chamber is heated by such exhaust gases.

4. A power plant as set forth in claim 1, including catch nozzles arranged to collect the steam after the same has passed through the turbine rotor, a collecting chamber connected to said catch nozzles to receive the steam therefrom, a second turbine having steam nozzles, a conduit between said collecting chamber and said steam nozzles to conduct to the latter the exhaust steam of said first mentioned turbine, a condenser arranged to receive the steam exhausting from said second turbine, and a conduit for conducting the condensate from said condenser to the boiler.

HANS HOLZWARTH.